United States Patent [19]

Baker

[11] Patent Number: 5,461,778
[45] Date of Patent: Oct. 31, 1995

[54] GATE VALVE

[76] Inventor: Dwight Baker, P. O. Box 249, Rush Springs, Okla. 73082

[21] Appl. No.: 366,089

[22] Filed: Dec. 28, 1994

Related U.S. Application Data

[62] Division of Ser. No. 196,684, Feb. 15, 1994, Pat. No. 5,377,955.
[51] Int. Cl.$^6$ ........................... F16K 3/00
[52] U.S. Cl. .................. 29/890.124; 29/890.129
[58] Field of Search ............ 29/890.12, 890.124, 29/890.127, 890.129; 251/326, 327, 368

[56] References Cited

U.S. PATENT DOCUMENTS

| | | | |
|---|---|---|---|
| 3,837,356 | 9/1974 | Selep et al. | 251/368 X |
| 4,529,169 | 7/1985 | Johns et al. | 251/368 X |
| 4,997,162 | 3/1991 | Baber et al. | 251/327 |
| 5,143,348 | 9/1992 | Baber et al. | |
| 5,211,373 | 5/1993 | Baber . | |

Primary Examiner—John C. Fox
Attorney, Agent, or Firm—Dunlap & Codding

[57] ABSTRACT

A gate valve comprising a valve body, a gate, a bonnet assembly and an actuator assembly. The gate having a closure area, a flow opening extending through the gate, and a recess circumscribing the flow opening and the closure area having a material disposed therein and case hardened to form a wear resistant sealing surface about the flow opening and the closure area having a hardness greater than about 50 Rockwell. The gate being press fitted between a pair of seat rings such that the sealing surface remains in sealing engagement against the seat rings to provide a substantially fluid tight seal when the gate is in an open and closed position. The actuating assembly is connected to the gate for reciprocally moving the gate across the flow bore between the open position and the closed position.

10 Claims, 5 Drawing Sheets

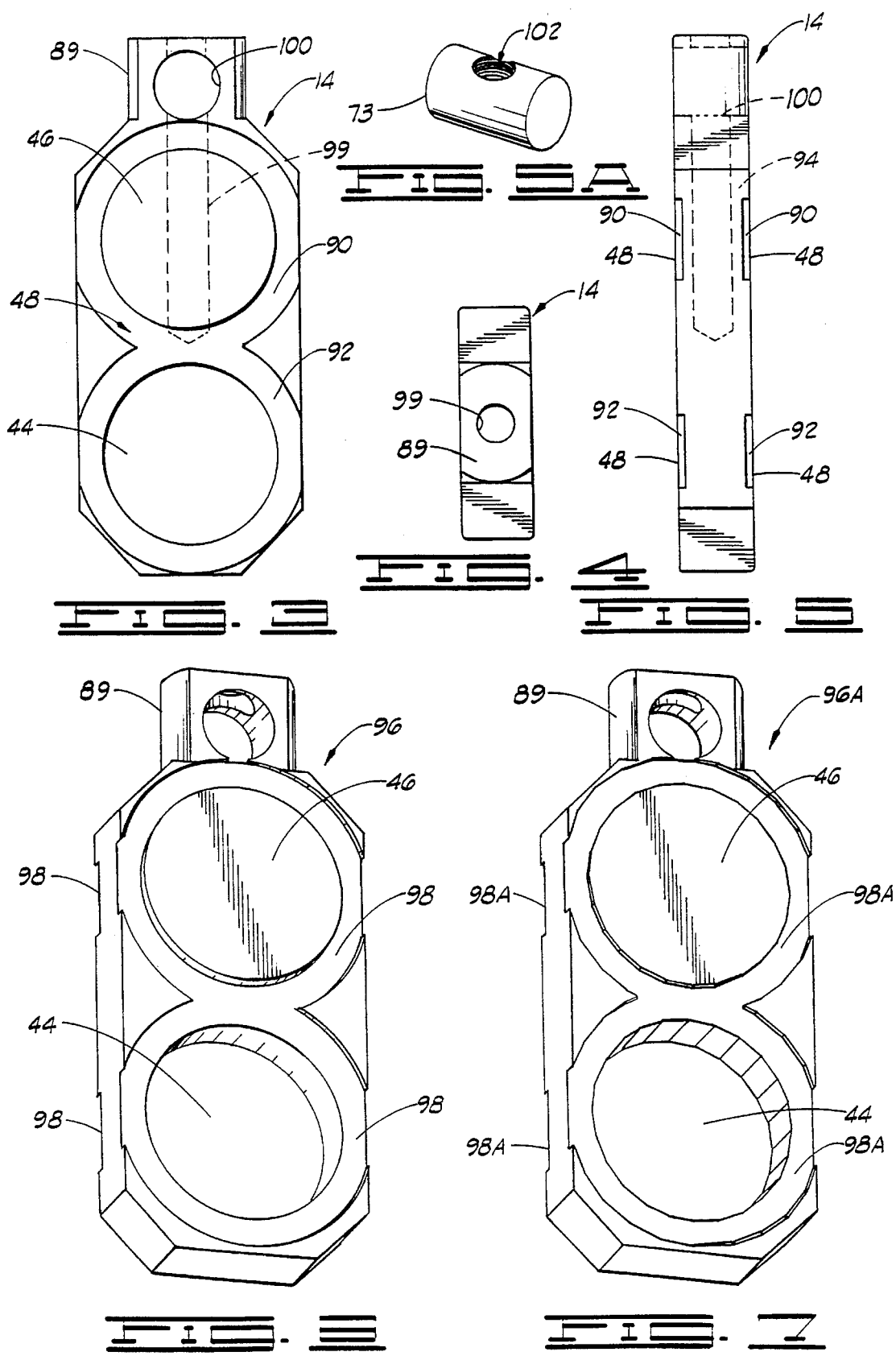

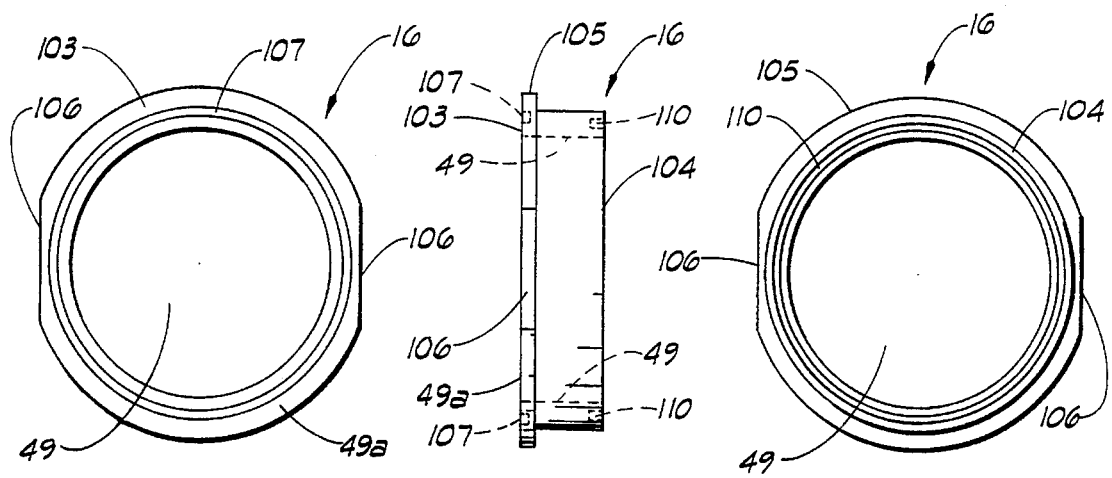
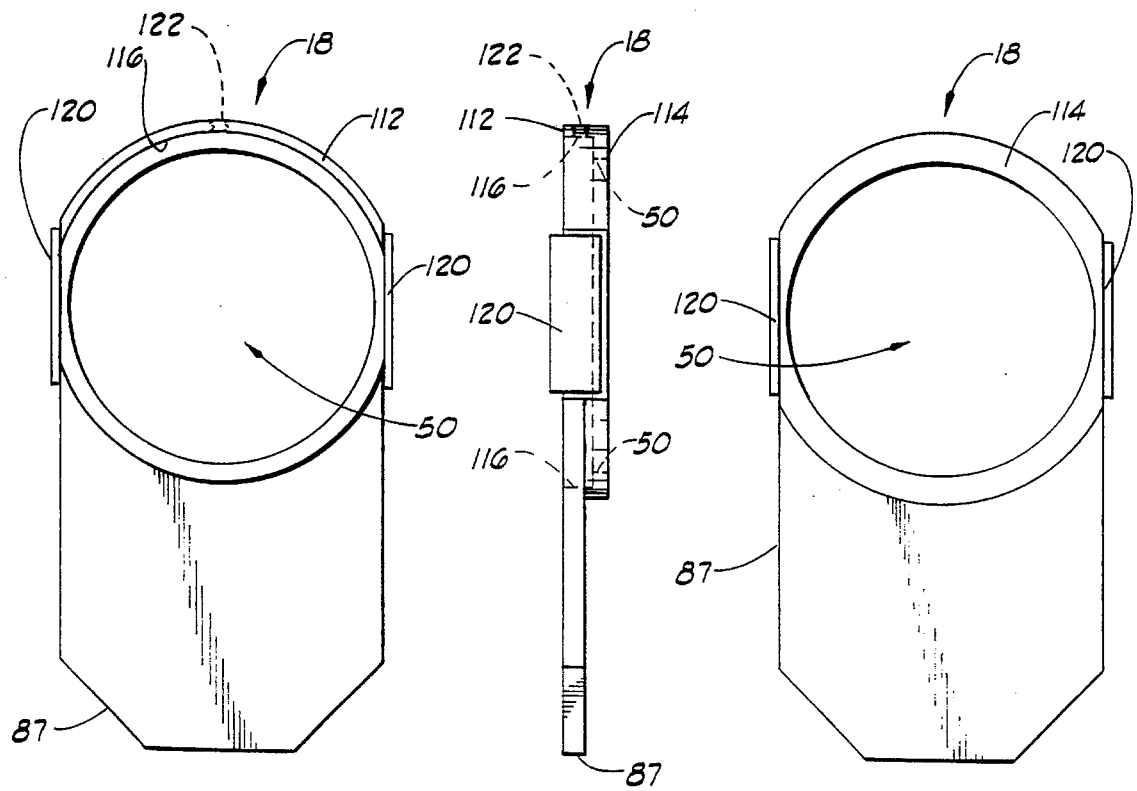

GATE VALVE

This application is a divisional of U.S. Ser. No. 08/196,684, filed Feb. 15, 1994 now U.S. Pat. No. 5,377,955.

BACKGROUND OF THE INVENTION

1. Field of the Invention

The present invention relates generally to valves, and more particularly, but not by way of limitation, to an improved gate valve for controlling the flow of hydraulic fracturing fluid during well fracturing operations.

2. Description of Related Art

Several methods may be used to stimulate hydrocarbon production in old and new wells. Two common and effective methods are acidizing and hydraulic fracturing.

In general, acid treatment involves the injection of acid into an acid-soluble pay zone where the acid reacts with the rock and dissolves portions of the formation so as to enlarge existing voids and thereby increase the permeability of the zone.

Hydraulic fracturing, on the other hand, involves the injection of a fracturing fluid and propping agent into the pay zone under sufficient pressure to open existing fractures and create new fractures. The fractures are extended some distance into the formation by continued high pressure injection. Upon cessation of pumping, the fractures are held open by the propping agent which is commonly a carefully sized, silica sand.

Control and containment of injection pressures during both acidizing and hydraulic fracturing operations is critical. To this end, injection pressures are conventionally controlled with gate valves and other components such as isolation tools and blow out preventers. However, problems have been encountered when employing conventional equipment of the prior art.

For example, because of the abrasive and corrosive nature of high pressure fracturing and acidizing fluids, expensive and time consuming repairs to valves and other equipment is often necessary after each well stimulation treatment. In particular, the gate or closure member of the gate valve is galled and scratched by the high pressure, sand-carrying fluid thereby causing the valve to leak. This results in the loss of lubricant contained in the valve body to facilitate movement of the gate and to reduce wear on the gate. Loss of lubricant increases the wear on the gate and the risk that water will invade the valve body and cause the valve to freeze.

Another common problem encountered during fracturing operations is the invasion of sand or acid into the valve body. The sand becomes compacted in the top and bottom of the valve body causing the valve to be inoperable. Similarly acid reacts with the lubricant and corrodes the valve body.

All the problems discussed above, as well as others, increase operating costs and increase the chance of injury due to equipment failure. Thus, a need has long existed for an improved gate valve which has a hard sealing surface resistant to galling and scratching and which is designed to prevent the invasion of proppant into the valve body and the loss of lubricant, while also being inexpensive to manufacture, easy to maintain and convenient to operate. It is to such a gate valve that the present invention is directed.

BRIEF DESCRIPTION OF THE DRAWINGS

FIG. 3 is a front elevational view of the gate shown in FIGS. 1 and 2.

FIG. 4 is a top view of the gate.

FIG. 5 is a side elevational view of the gate.

FIG. 5A is a perspective view of a gate nut.

FIG. 6 is a perspective view of the gate illustrating the recesses in the gate.

FIG. 7 is a perspective view of another embodiment of the gate.

FIG. 8 is a front elevational view of a seat ring shown in FIGS. 1 and 2.

FIG. 9 is a side elevational view of the seat ring.

FIG. 10 is a rear elevational view of the seat ring.

FIG. 11 is a front elevational view of a gate guide shown in FIGS. 1 and 2.

FIG. 12 is a side elevational view of the gate guide.

FIG. 16 is a fragmental, cross sectional view illustrating the gate in a closed position.

DETAILED DESCRIPTION

Figure 1:
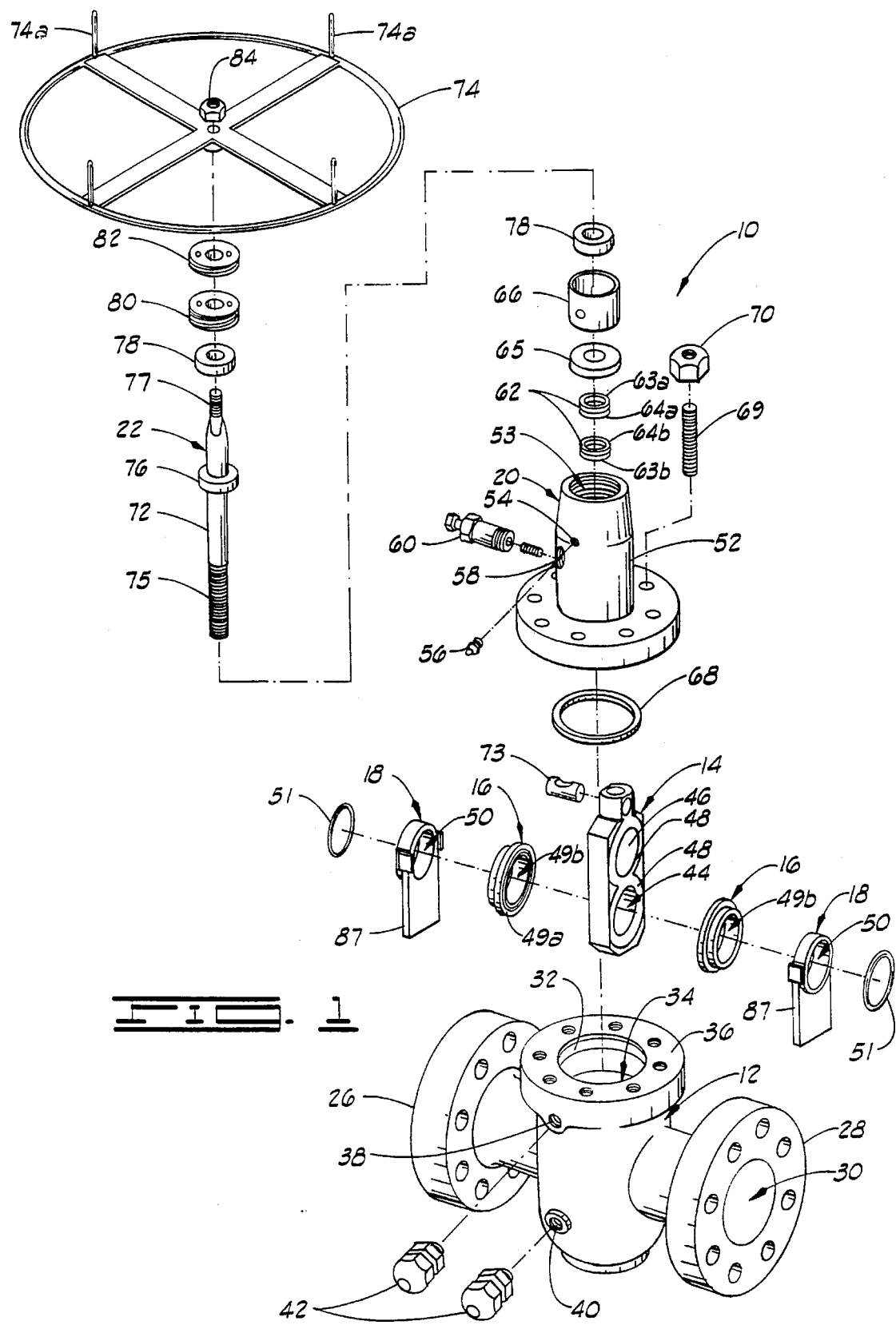
FIG. 1 is an exploded, perspective view of a gate valve constructed in accordance with the present invention.

Referring now to the drawings, and more particularly to FIG. 1, a gate valve 10 constructed in accordance with the present invention is shown in an exploded perspective view. The gate valve 10 includes a valve body 12, a gate 14, a pair of seat rings 16, a pair of gate guides 18, a bonnet assembly 20, and an actuating assembly 22.

The valve body 12 has an inlet end 26, an outlet end 28 and a flow bore 30 which extends between the inlet end 26 and the outlet end 28 of the valve body 12. The inlet end 26 and the outlet end 28 of the valve body 12 have flanges or any other conventional structure for interconnecting the gate valve 10 to a fluid flow line, a wellhead assembly or the like.

The valve body 12 further has an upper opening 32 providing access to a gate chamber 34 traversing the flow bore 30 of the valve body 12. An upper flange 36 extends around the upper opening 32 for attachment of the bonnet assembly 20 (described hereinbelow) over the upper opening 32.

An upper lubricating port 38 and a lower lubricating port 40 are disposed in the valve body 12 for injecting a lubricating substance into upper and lower areas of the gate chamber 34 so as to facilitate movement of the gate 14 and reduce wear. Body fittings 42 are provided to plug the upper and lower lubricating ports 38 and 40.

The gate 14 has a gate opening or flow opening 44, a closure area 46 and sealing surfaces 48 which circumscribe the gate opening 44 and the closure area 46 on each side of the gate 14. The sealing surfaces 48 of the gate 14 will be described in further detail hereinbelow.

One seat ring 16 and one gate guide 18 are disposed in the gate chamber 34 on one side of the gate 14, and another seat ring 16 and gate guide 18 are disposed in the gate chamber 34 on the other side of the gate 14. Each seat ring 16 has a seat surface 49a and a seat ring opening 49b. Similarly, each gate guide 18 has a guide opening 50 dimensioned to matingly receive one seat ring 16. An elastomeric O-ring 51 is provided to effect a fluid tight seal between each seat ring 16 and the valve body 12 within the gate chamber 34.

While it is preferable to employ a pair of seat rings and gate guides in the present invention, it will be understood that an effective seal may be obtained wherein the valve body is configured to have a pair of seat surfaces incorporated therein rather than requiring the use of seat rings.

The bonnet assembly 20 includes a bonnet 52 having a bonnet cavity 53 extending therethrough. The bonnet 52 has a grease port 54 plugged with a grease fitting 56 and a packing port 58 which is sealed with a packing fitting 60. The bonnet assembly 20 further includes a packing set 62, comprising an upper packing adapter 63a and packing rings 64a and a lower packing adapter 63b and packing rings 64b; a packing retainer bushing 65; and a bearing retainer sleeve 66.

When mounting the bonnet assembly 20 to the valve body 20, a bonnet gasket 68 is positioned between the bonnet 52 and the valve body 12 to effect a fluid tight seal therebetween. A plurality of bonnet studs 69 and bonnet stud nuts 70 secure the bonnet 52 to the valve body 12. For simplicity of illustration, only one bonnet stud 69 and bonnet stud nut 70 are shown in FIG. 1.

The actuator assembly 22, for reciprocally moving the gate 14 between an open position and a closed position, includes a valve stem 72 journaled through the bonnet assembly 20, a gate nut 73 for connecting the valve stem 72 to the gate 14, and a handwheel 74 having a plurality of handwheel handles 74a. The valve stem 72 has a threaded lower portion 75, a valve stem collar 76 and a threaded upper portion 77. A pair of thrust bearings 78 are journaled around the valve stem 72. One of the thrust bearings 78 is journaled around the valve stem 72 above the valve stem collar 76 and the other thrust bearing 78 is journaled around the valve stem 72 below the valve stem collar 76.

A bearing retainer nut 80 and a bearing retainer lock nut 82 are screwed into the bonnet 52 to secure the packing set 62, the packing retainer bushing 65, the bearing retainer sleeve 66, the valve stem 72 and the thrust bearings 78 within the bonnet 52. A handwheel nut 84 is attached to the threaded upper portion 77 of the valve stem 72 to connect the handwheel 74 to the valve stem 72. It should be noted that while the actuating assembly 20 has been described herein has employing a manually operated handwheel 74, any suitable type of actuator can be used, such as a pneumatic, electric or hydraulic actuators.

Figure 2:
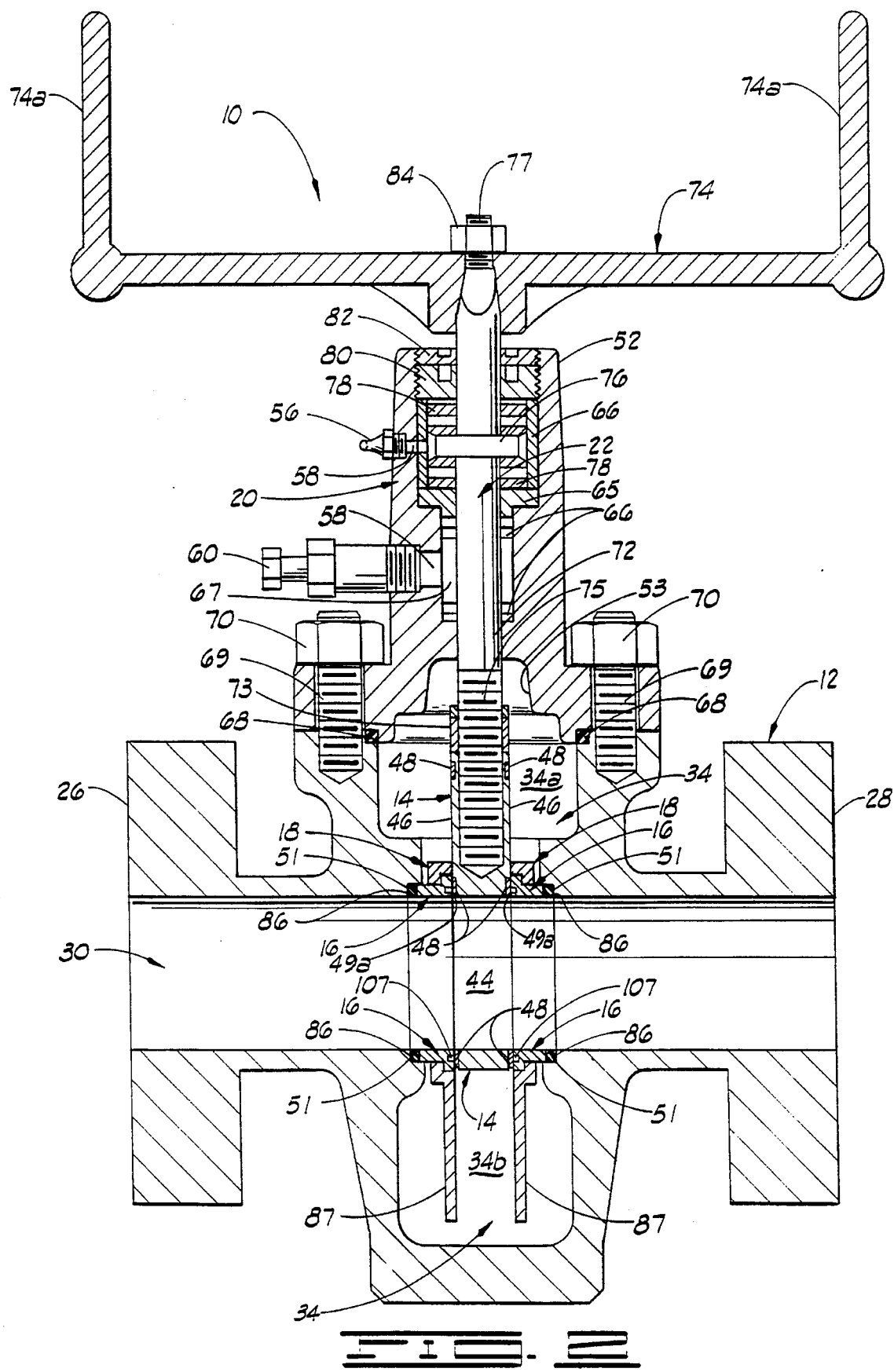
FIG. 2 is an elevational view, partially in cross section, of the gate valve of FIG. 1 assembled.

Referring now to FIG. 2, the gate valve 10 is shown assembled. The gate 14 is disposed in the gate chamber 34 for reciprocating movement across the flow bore 30 to control the flow of fluid through the flow bore 30. To control the flow, the gate 14 is moved between the open position (FIG. 2) wherein the flow opening 44 of the gate 14 is aligned with the flow bore 30, and the closed position wherein the closure area 46 of the gate is aligned with the flow bore 30. The gate chamber 34 has an upper area 34a above the gate 14 and a lower area 34b below the gate 14 where a lubricating substance in injected to facilitate movement of the gate 14 and to reduce wear on the gate 14.

To properly position the seat rings 16 within the valve body 12, the valve body 12 is provided with a pair of counter bores 86 in the flow bore 30. The counter bores 86 are located at opposite sides of the gate chamber 34 and are sized to matingly receive the seat rings 16. One of the O-rings 51 is positioned between the valve body 12 and the corresponding seat ring 16 to effect a fluid tight seal between the valve body 12 and the seat ring 16 in the corresponding counter bore 86.

To prevent invasion of sand, grit and the like into the upper and lower areas 34a and 34b of the gate chamber 34, the counter bore 86, the seat rings 16 and the gate 14 are machined to tolerances such that the gate 14 is press fitted between the seat rings 16. As a result, the gate 14 remains in sealing engagement with the seat surface 49a of each seat ring 16 so as to effect a bidirectional seal when the gate 14 is in the open position and, the closed position.

Each gate guide 18 is mounted to a corresponding one of the seat rings 16 and extends downward into the lower area 34b of the gate chamber 34. That is, each gate guide 18 has a downwardly extending guide skirt 87 which is in substantial alignment with the seat surface 49a of the seat ring 16 when the gate guide 18 is mounted to the seat ring 16. Thus, the guide skirt 87 cooperates with the gate 14 to minimize the loss of lubricant and the invasion of sand and acid into the body cavity 34 as the gate 14 is moved between the open position and the closed position. It should be appreciated that the guide skirt 87 of each gate guide 18 extends downward for a distance which is approximately equal to the diameter of the flow bore 30.

The threaded lower portion 75 of the valve stem 72 extends into the upper end of the gate 14 for connection therewith (the connection of the valve stem 72 and the gate 14 is described in detail hereinbelow). The packing set 62, the packing retainer bushing 65, the bearing retainer sleeve 66, the thrust bearings 78, and the bearing retainer nut 82 are assembled in the bonnet cavity 53 with the valve stem 72 extending through each in a conventional manner. FIG. 2 further illustrates a plastic packing 67 having been injected between the upper packing rings 64a and the lower packing rings 64b via the packing port 58 in a manner well known in the art.

Referring now to FIGS. 3–6, the gate 14 is shown separately. The gate 14 includes a gate neck 89, the gate opening 44, the closure area 46 and the sealing surface 48. As best illustrated by FIG. 3, the sealing surface 48 is substantially shaped like a figure eight having an upper loop 90 encircling the closure area 46 and a lower loop 92 around the gate opening 44. As indicated by FIG. 5, the gate 14 has sealing surfaces 48 on both sides of the gate 14.

Except for the sealing surfaces 48, the gate 14 is preferably made of steel or stainless steel; however, the gate 14 may be constructed of any other suitable material. Stainless 17-4 PH has a hardness in the range of 25 to 35 Rockwell and is a particularly suitable material for the gate 14.

The sealing surfaces 48 of the gate 14, on the other hand, comprise a wear-resistant alloy of cobalt, chromium and tungsten. A preferred wear-resistant alloy for the sealing surfaces 48 of the gate 14 is known in the industry as "STELLITE" No. 6, which is approximately 63 percent cobalt, 28 percent chromium and 5 percent tungsten.

The gate 14 may be made by producing a casting 96 having the gate opening 44, the closure area 46 and recesses 98 formed on both sides of the gate 14 which circumscribe the closure area 46 and gate opening 44, as best shown in FIG. 6. The recesses 98 are sized and shaped to receive a wear-resistant alloy as the sealing surfaces 48. In other words, recesses 98 are cast to a depth suitable for welding the alloy to the gate 14 which is preferably about 0.020 inches to 0.070 inches deep. It should be appreciated that the depth of the recesses 98 is exaggerated in FIG. 6 for clarity of illustration.

After producing the casting 96, "STELLITE" rods are disposed in the recesses 98 and welded to the gate 14. The casting 96 and the "STELLITE" sealing surfaces 48 are then ground to finished tolerances so that the sealing surfaces 48 are flush with the surface of the gate 14.

The "STELLITE" sealing surfaces have a hardness in the range of 43 to 46 Rockwell. While harder than stainless steel, the "STELLITE" sealing surfaces may still be susceptible to scratching or galling from exposure to acids and high pressure, sand-carrying fluids. Therefore, to increase the hardness of the sealing surfaces 48 to a final hardness, the "STELLITE" sealing surfaces 48 are case hardened by nitriding. By virtue of the nitriding process, the hardness of the "STELLITE" sealing surfaces is raised to at least 50 Rockwell and preferably raised to at least 60 Rockwell.

Various nitriding techniques are wellknown in the art. Thus, no further discussion of nitriding techniques is believed necessary to enable one of ordinary skill in the art to understand the gate valve 10 of the present invention.

To ensure proper gate and seat ring alignment, the gate 14 is adapted to be connected to the valve stem 72 in such a manner that the gate 14 is able to move laterally relative to the valve stem 72, thereby allowing the gate 14 and the seat rings 16 to align in a parallel fashion. More specifically, the gate 14 includes a stem receiving bore 99 disposed down through the gate neck 89 of the gate 14 and a nut receiving socket 100 disposed in the gate neck 89 parallel to the flow opening 44 such that the nut receiving socket 100 intersects the stem receiving bore 99.

The stem receiving bore 99 is sized such that the valve stem 72 has a diameter less than the diameter of the stem receiving bore 99. Therefore, the valve stem 72 fits loosely in the stem receiving bore 99, and thus the gate 14 is able to move laterally relative to the valve stem 72 when the valve stem 72 is received by the gate 14.

The gate 14 is coupled to the valve stem 72 with the gate nut 73 (best shown in FIG. 5A) so as to allow lateral movement of the gate 14. The gate nut 73 is shaped to be slidingly disposed in the nut receiving socket 100. Furthermore, the gate nut 73 has a length greater than the diameter of the stem receiving bore 99. The gate nut 73 is provided with a threaded bore 102 which is dimensioned to threadingly receive the threaded end portion 75 of the valve stem 72.

To connect the gate 14 to the valve stem 72, the gate nut 73 is first disposed in the nut receiving socket 100 such that the threaded bore 102 of the gate nut 73 is aligned with the stem receiving bore 99. The threaded end portion 75 of the valve stem 72 is then inserted into the stem receiving bore 99 and threaded through the threaded bore 102 of the gate nut 73. Actuation of the valve stem 72 with the handwheel 74, or other suitable actuator, causes the gate nut 73 to travel up and down the threaded end portion 75 of the valve stem 72 thereby effecting movement to the gate 14.

Shown in FIG. 7 is another embodiment of a casting 96A. The casting 96A has recesses 98A which are polygonal rather than substantially circular.

Referring now to FIGS. 8–10, shown therein is one of the seat rings 16 separately. Each seat ring 16 has a front face 103, a rear end 104 and the seat ring opening 49b extending through the seat ring 16 between the front face 103 and the rear end 104. Each seat ring 16 further has a front shoulder 105 which protrudes radially from the seat ring 16. Except for two flattened areas 106 at opposite sides, the front shoulder 105 of each seat ring 16 is cylindrical in shape. The front face 103 of each seat ring 16 defines the seat surface 49a for sealing engagement with one of the sealing surfaces 48 of the gate 14.

Figure 15:
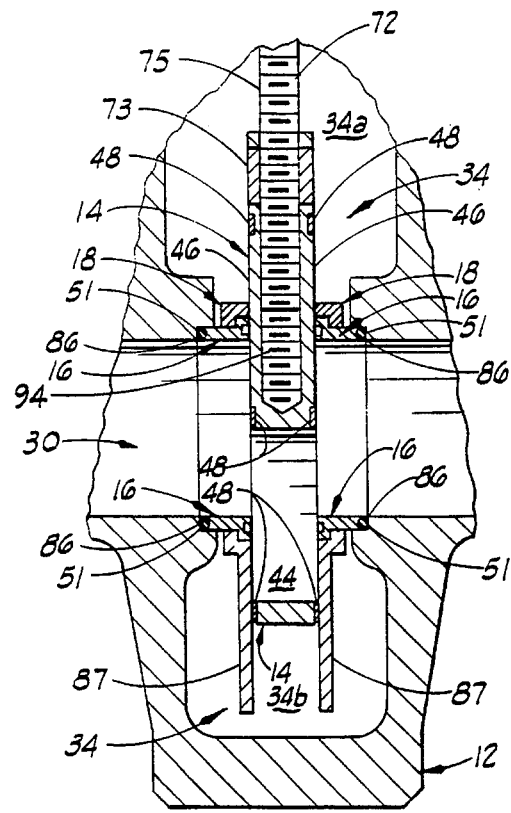
FIG. 15 is a fragmental, cross sectional view illustrating the gate in a partially open position.

Despite the fact that the sealing surfaces 48 of the gate 14 are resistant to scratching and galling and the gate 14 is press fitted between the seat rings 16, isolated grains of sand may be forced between the gate 14 and the seat rings 16 wherein the sand can damage the seat rings 16 and the gate 14 after repeated movement of the gate 14 across the seat surface 49a. To this end, the front face 103 of each seat ring 16 is provided with an annular groove 107. Objects which become situated between the gate 14 and the seat surface 49a of the seat rings 16, such as grains of sand, deposit into the groove 107 as the gate 14 is moved across the seat surface 49a, thereby ensuring that sealing contact is maintained between the seat rings 16 and the gate 14. As best illustrated in FIG. 15, the groove 107 is in fluid communication with the flow bore 30 when the gate 14 is in a partially open position. Thus, any objects deposited in the groove 107 are in turn flushed therefrom. Lubricant from the gate cavity 34 also deposits in the groove 107 thereby facilitating movement of the gate 14.

The rear end 104 of each seat ring 16 is cylindrical and is sized to be matingly received by a corresponding one of the counter bores 86 of the valve body 12. The rear end 104 is further provided with an annular groove 110 for receiving one of the O-ring seals 51 which is adapted to engage the valve body 12 so as to enhance the forming of a fluid tight seal between the seat ring 16 and the valve body 12.

Figure 13:
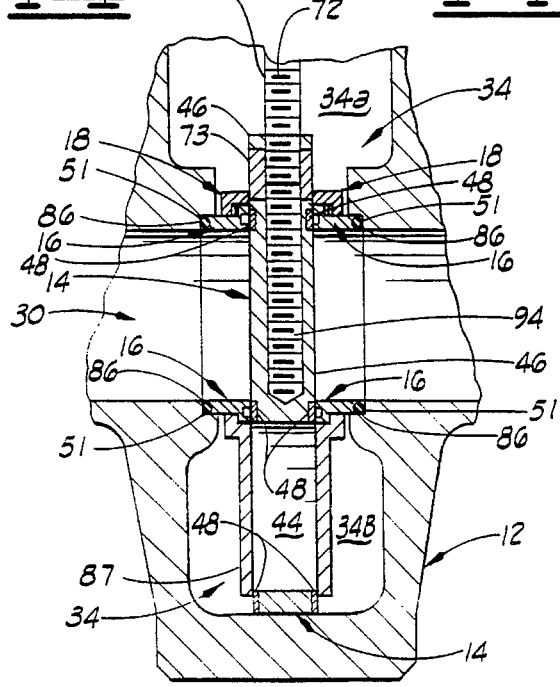
FIG. 13 is a rear elevational view of the gate guide.

Referring now to FIGS. 11–13, shown therein is one of the gate guides 18 separately. Each gate guide 18 has a front end 112, a rear end 114 and the guide opening 50 which extends through the gate guide 18 between the front and rear ends 112 and 114.

As best shown in FIG. 12, each gate guide 18 has a guide counter bore 116 in the guide opening 50. The guide counter bore 116 extends from the front end 112 partially into the gate guide 18 and is sized and shaped to matingly receive the front shoulder 105 of the corresponding seat ring 16. To this end, the gate guide 18 is provided with a pair of parallel guide members 120 which mate with the flattened areas 106 of the seat ring 16 when the seat ring 16 is inserted into the guide opening 50 so as to prevent rotational movement of the seat ring 16 relative to the gate guide 18. The guide opening 50 is further sized to matingly receive the rear end 104 of the corresponding seat ring 16 as shown in FIG. 2.

To maintain the proper operating alignment of the gate 14 with the seat rings 16, the guide members 120 extend a distance from the front end 112 of the gate guide 18 thus forming a slot in which the gate 14 is maintained.

As discussed above, each gate guide 18 is provided with a downwardly extending guide skirt 87 which is in substantial alignment with the seat surface 49a of the seat ring 16 when the gate guide 18 is mounted to the seat ring 16. Thus, the guide skirt 87 cooperates with the gate 14 to minimize the loss of lubricant from the gate chamber 34 and the invasion of sand and acid into the gate chamber 34 as the gate 14 is moved between the open position and the closed position.

To secure the seat ring 16 to the gate guide 18, the gate guide 18 is provided with a threaded bore 122 (shown in phantom in FIGS. 11–13) in the top thereof. The threaded bore 122 is dimensioned to threadingly receive a set screw (not shown) which holds the seat ring 16 in position relative to the gate guide 18 when tightened against the seat ring 16. The gate guides 18 are preferably secured to the seat rings 16 after the gate 14 has been pressed between the seat rings 16, thereby reducing the amount of force needed to insert the gate 14 into the valve body 12.

OPERATION

The operation of the gate valve 10 is best illustrated with reference to FIGS. 14–16. It will be appreciated that only a portion of the valve body 12 is illustrated in FIGS. 14–16 for purposes of clarity.

Figure 14:
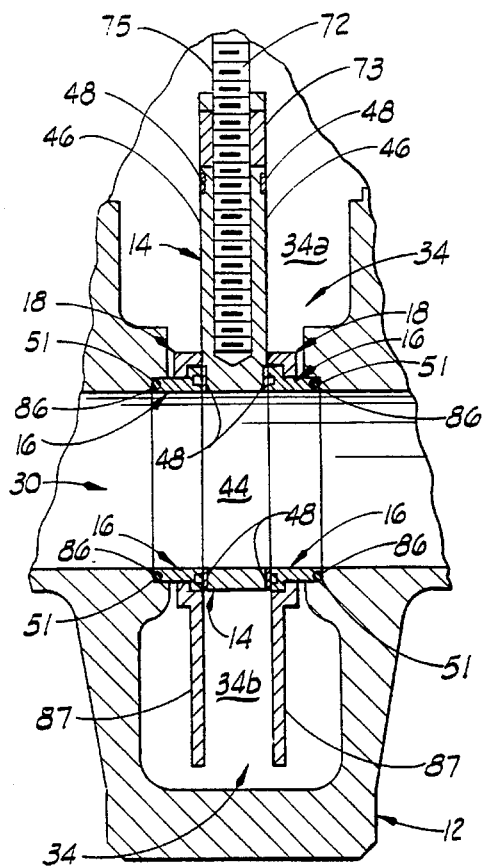
FIG. 14 is a fragmental, cross sectional view illustrating the gate in an open position.

The open position of the gate valve 10 is shown in FIG. 14. In this position, the gate opening 44 is aligned with the seat ring openings 49b and the flow bore 30 of the valve body 12 to allow the maximum fluid flow through the gate valve 10.

In the open position, the sealing surfaces 48 of the gate 14 engage the seat surfaces 49a of the seat rings 16 to effect a fluid tight seal therebetween. Thus, objects such as sand or acid which may be present in the flow bore 30 are prevented from entering the gate chamber 34 and contaminating the lubricants in the upper and lower areas 34a and 34b of the gate chamber 34.

Shown in FIG. 15 is the gate 14 in a partially open position wherein the gate 14 is positioned between the open position and the closed position. In this position, a lower portion of the gate sealing surfaces 48 engage the guide skirts 87 of the gate guides 18 so as to minimize the loss of lubricant from the lower part 34b of the gate chamber 34 and the invasion of contaminants into the lower part 34b of the gate chamber 34. Furthermore, because the gate 14 is press fitted between the seat rings 16, an effective seal is provided between the closure area 46 of the gate 14 and the seat surface of the seat rings 16. As such, objects such as sand and acids traveling through the flow bore 30 are prevented from entering the upper part 34a of the gate chamber 34 and contaminating the lubricants therein.

FIG. 15 also illustrates the groove 107 disposed in the front face 103 of the seat rings 16 being in fluid communication with the flow bore 30 when the gate 14 is positioned between the open position and the closed position. Because the groove 107 is in fluid communication with the flow bore 30, any objects deposited in the groove 107 are flushed therefrom as the gate 14 is moved between the open position and the closed position.

The closed position of the gate valve 10 is illustrated by FIG. 16. In this position, the portion of the sealing surfaces 48 circumscribing the closure area 46 engage the seat surfaces 49a of the seat rings 16 to provide a fluid tight seal. The increased hardness of the sealing surfaces 48 prevents the sealing surfaces 48 from becoming damaged: which in turn prevents fluid from leaking into the gate chamber 34 and lubricant in the gate chamber 34 from leaking out.

Changes may be made in the construction and the operation of the various components, elements and assemblies described herein without departing from the spirit and scope of the invention as defined in the following claims.

What is claimed is:

1. A method of forming a gate for a gate valve, the method comprising the steps of:

providing a plate having a first side and a second side;

forming an opening through the plate between the first and second sides thereof such that the plate is characterized as having a closure area and a flow opening;

forming a first recess in the plate wherein the first recess circumscribes the flow opening and the closure area on the first side of the gate forming a second recess in the plate wherein the second recess circumscribes the flow opening and the closure area on the second side of the gate;

fixing an alloy into each of the recesses.

2. The method of claim 1 wherein the alloy is fixed into each of the recesses by welding.

3. The method of claim 2 further comprising the step of:

shaping the alloy so that the alloy in one of the recesses is flush with the first side of the plate and the alloy in the other recess is flush with the second side of the plate.

4. The method of claim 3 further comprising the step of:

case hardening the alloy to a hardness greater than about 50 Rockwell.

5. The method of claim 4 wherein the alloy is case hardened by nitriding.

6. The method of claim 5 wherein the alloy fixed in the recesses comprises approximately 63 percent cobalt, 28 percent chromium and 5 percent tungsten.

7. The method of claim 6 wherein each recess is formed in the plate to a depth suitable for welding the alloy to the plate.

8. The method of claim 7 wherein each recess is formed in the plate to a depth of about 0.020 inches to 0.070 inches.

9. The method of claim 7 wherein the plate is stainless steel.

10. The method of claim 7 wherein the plate is steel.

\* \* \* \* \*

UNITED STATES PATENT AND TRADEMARK OFFICE
CERTIFICATE OF CORRECTION

PATENT NO. : 5,461,778
DATED : October 31, 1995
INVENTOR(S) : Baker

It is certified that error appears in the above-identified patent and that said Letters Patent is hereby corrected as shown below:

Column 3, lines 16-17, please delete "valve body 20" and substitute therefor --valve body 12--.

Column 3, line 42, please delete "actuating assembly 20" and substitute therefor --actuating assembly 22--.

Column 3, line 43, please delete "has" and substitute therefor --as--.

Column 3, line 44, after "such as" please delete "a".

Column 3, line 56, please delete "in" and substitute therefor --is--.

Column 4, line 17, please delete "body cavity 34" and substitute therefor --gate chamber 34--.

Column 4, line 27, please delete "retainer nut 82" and substitute therefor --retainer lock nut 82--.

Column 5, line 40, please delete "threaded end portion 75" and substitute therefor --threaded lower portion 75--.

Column 5, line 45, please delete "threaded end portion 75" and substitute therefor --threaded lower portion 75--.

UNITED STATES PATENT AND TRADEMARK OFFICE
CERTIFICATE OF CORRECTION

PATENT NO. : 5,461,778
DATED : October 31, 1995
INVENTOR(S) : Baker

It is certified that error appears in the above-identified patent and that said Letters Patent is hereby corrected as shown below:

Column 5, line 50, please delete "threaded end portion 75" and substitute therefor --threaded lower portion 75--.

Column 6, lines 16-17, please delete "gate cavity 34" and substitute therefor --gate chamber 34--.

Signed and Sealed this

Fifth Day of March, 1996

Attest:

BRUCE LEHMAN

Attesting Officer

Commissioner of Patents and Trademarks